United States Patent [19]
Delzer

[11] 3,955,198
[45] May 4, 1976

[54] RADAR RF GENERATOR INCLUDING A STABLE LOCAL OSCILLATOR AND AN EXCITER CIRCUIT

[75] Inventor: Dennis Richard Delzer, Richardson, Tex.

[73] Assignee: Texas Instruments Incorporated, Dallas, Tex.

[22] Filed: Dec. 26, 1973

[21] Appl. No.: 427,900

[52] U.S. Cl. ................................. 343/17.7; 328/63
[51] Int. Cl.² ...................... G01S 7/42; H03K 1/17
[58] Field of Search ..................... 343/17.7; 328/63; 307/26 G

[56] References Cited
UNITED STATES PATENTS

| | | | |
|---|---|---|---|
| 2,802,105 | 8/1957 | Odden | 328/63 X |
| 2,935,609 | 5/1960 | Rabin et al. | 328/63 X |
| 2,948,879 | 8/1960 | Padberg, Jr. et al. | 328/63 X |
| 3,263,228 | 7/1966 | Abrahams et al. | 343/17.7 |
| 3,354,457 | 11/1967 | Pfab et al. | 343/17.7 |
| 3,427,615 | 2/1969 | Hubka | 343/17.7 |
| 3,774,206 | 11/1973 | Rauch | 343/17.7 X |

Primary Examiner—Malcolm F. Hubler
Attorney, Agent, or Firm—Harold Levine; Rene' E. Grossman; Alva H. Bandy

[57] ABSTRACT

The specification discloses a RF generator for use in a radar system. The generator includes an oscillator having a crystal for generating a predetermined VHF signal. A multiplier multiplies the VHF signal to a desired RF signal. Amplifying circuitry amplifies the RF signal and applies a signal to a first isolator. A filter is connected to the output of the first isolator and includes plural cavaties for filtering all but a selected narrow bandwidth signal from the RF signal. A power divider divides the narrow bandwidth signal to provide a stable local oscillator signal and an exciter signal. A second isolator is connected to receive the exciter signal and a high pass filter is connected to the output of the isolator. A coherent oscillator generates a stable coherent oscillator signal and a transmit switch is provided to gate the coherent oscillator signal in response to a radar timing signal. A mixer mixes the gated coherent oscillator signal with the filtered exciter signal. A bandpass filter passes a selected one of the upper and lower side bands of the output from the mixer. An exciter amplifier is connected to amplify the output of the bandpass filter and to apply the signal through a third isolator to the radar system.

11 Claims, 4 Drawing Figures

3,955,198

RADAR RF GENERATOR INCLUDING A STABLE LOCAL OSCILLATOR AND AN EXCITER CIRCUIT

FIELD OF THE INVENTION

This invention relates to RF generators, and more particularly relates to RF generators which include a stable local oscillator and an exciter circuit for use in a radar system.

THE PRIOR ART

It is important to provide a very stable source of RF signals for radar systems, and in particular for moving target indicator (MTI) radar systems. For example, RF signals are required in a radar system for use in both the radar transmitter and receiver, as well as a master timing reference for the radar synchronizer located in the radar porcessor. The RF signals are utilized in the transmitter to drive the amplifier and the klystron and in the radar receiver as a local oscillator in the mixer. However, previously developed RF signal generators have often been quite complex and expensive, and have often not been completely satisfactory with respect to stability or noise characteristics. In addition, previously developed radar RF generators have often been difficult to tune between various desired output frequencies when it is desired to install the RF generator in various radar systems.

A need has thus arisen for a relatively simple and inexpensive RF generator system having extremely stable characteristics on the order of $\Delta f/f = 1 \times 10^{-10}$. Further, a need is present for an RF generator having extremely low noise characteristics and yet which is tunable over a range of output frequencies, such that the generator may be utilized in a variety of different radar systems without substantial modification.

SUMMARY OF THE INVENTION

In accordance with the present invention, an oscillator includes a crystal for generating a predetermined VHF signal. A multiplier multiplies the VHF signal to a desired RF signal. An amplifier amplifies the RF signal and applies the signal through a first isolator. A filter is connected to the output of the first isolator and includes plural cavities for filtering all but a selected narrow bandwidth signal from the RF signal. A power divider divides the narrow bandwidth signal to provide a stable local oscillator signal and an exciter signal. A second isolator passes the exciter signal to a high pass filter. A coherent oscillator generates a stable coherent oscillator signal and a transmit switch gates the coherent oscillator signal in response to a radar timing signal. A mixer is provided for mixing the gated coherent oscillator signal with the filtered exciter signal. A bandwidth filter passes a selected one of the upper and lower sidebands of the output from the mixer. An exciter amplifier amplifies the output of the bandpass filter. A third isolator is connected to pass the output of the exciter amplifier.

In accordance with another aspect of the invention, a tunable local oscillator is provided for a radar system which includes a crystal oscillator for generating a signal in the VHF range. A multiplier multiplies the predetermined frequency by a predetermined magnitude to generate a predetermined RF signal. Circuitry is provided to amplify the RF signal and a bandpass filter filters the RF signal. Circuitry is provided to vary the filter in order to vary the bandpass thereof. A divider network divides the signal output from the filter to provide a stable local oscillator signal and to provide a signal for application to a radar receiver exciter.

In accordance with yet another aspect of the invention, a tunable radar exciter circuit includes a source of RF signals. A high pass filter filters the RF signals and a coherent oscillator is provided to generate a stable coherent oscillator signal. A transmit switch gates the oscillator signal in response to a radar timing signal. A doubly balanced mixer mixes the gated oscillator signal with the filtered RF signals. A tunable bandpass filter passes a selected one of the upper and lower sidebands of the output from the mixer. An exciter amplifier amplifies the output from the bandpass filter to provide a radar exciter signal.

In accordance with yet another aspect of the invention, a system is provided to align a radar receiver exciter having a transmit switch for gating a coherent oscillator signal with a radar timing signal. The system includes a source of a continuous wave signal. A switch is connected between the source of the radar timing signal and the transmit switch and is operable to disconnect the radar timing signal and to connect the source of the continuous wave signal to the transmit switch, wherein the continuous wave signal enables alignment of the radar exciter. Circuitry senses the application of the continuous wave signal through the transmit switch and generates a signal indicating that the radar receiver is not available for operation.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
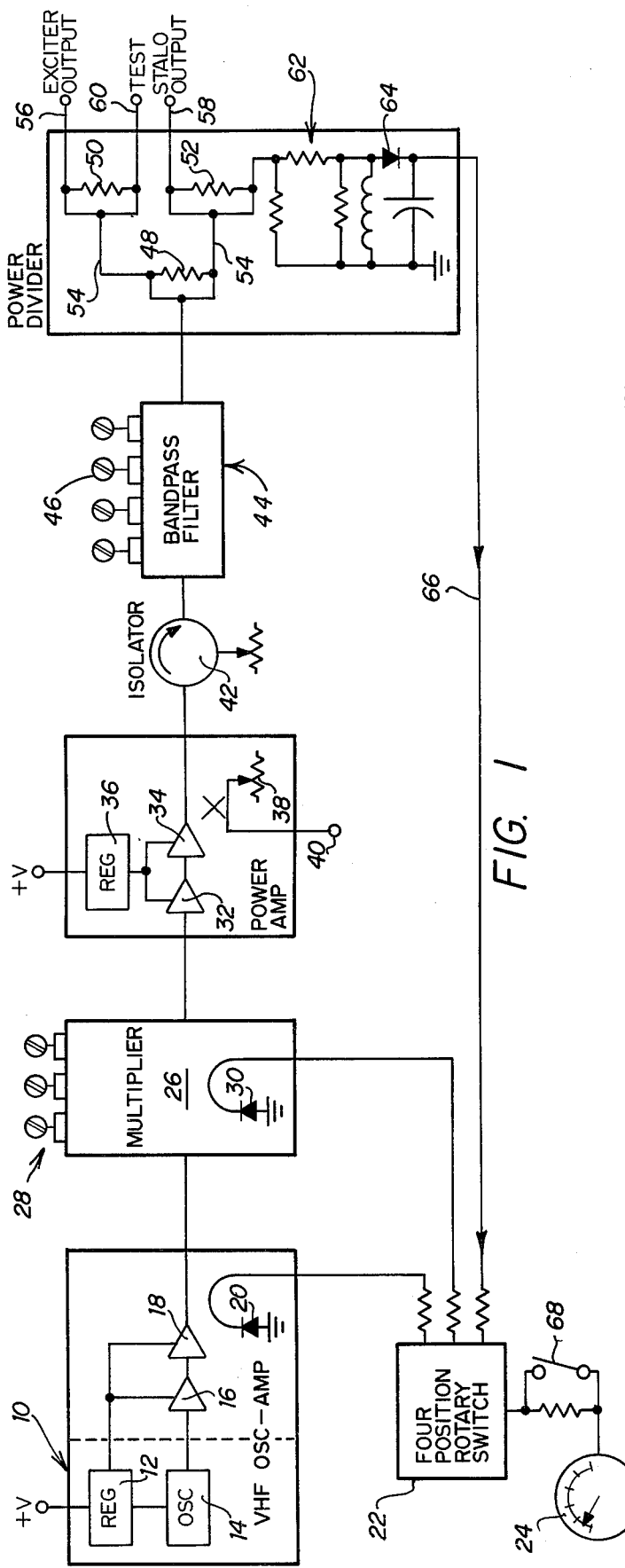
FIG. 1 is a block diagram of the stable local oscillator circuitry of the present system.

Referring to FIG. 1, the VHF oscillator 10 includes a voltage regulator 12 which provides a regulated voltage to a crystal controlled oscillator 14. A voltage regulator 12 may comprise for example a Fairchild Microamp 78M20HC voltage regulator. The oscillator 14 comprises a conventional oscillator of the type wherein one of a variety of crystals may be selectively inserted in order to determine the desired output frequency. A typical output frequency from oscillator 14 is 95–101 MHz. The output from oscillator 14 is applied through a two stage VHF amplifier including amplifiers 16 and 18 which provide appproximately 20 dB gain to the oscillator signal. A sensing diode 20 detects the amplified signal output from amplifier 18 and applies a signal through a four position rotary switch 22 to a meter 24 in order that the operation of the amplifier may be visually reviewed at a test panel.

The amplified oscillator signal is then applied to a multiplier 26 wherein the signal is multiplied by either 28 or 29 in order to provide an RF signal in the S band. The multiplier 26 includes a plurality of tuning elements 28 in order to enable the output of the multiplier to be tuned to a specified RF frequency. The output from the multiplier 26 will typically be within the range of 2670–2930 MHz. The multiplier 26 is described in *Hewlett-Packard Application Note* 920 entitled "Harmonic Generation", published January, 1969 by the Hewlett-Packard Corporation. A sensing diode 30 senses the operation of the multiplier 26 and supplies an electrical indication of the operation of the multiplier through the switch 22 to the meter 24.

The RF signal is then applied to a power amplifier including amplifier stages 32 and 34 connected in series to provide approximately 10 dB gain to the signal. A voltage regulator 36 of the type previously described powers the amplifiers 32 and 34. A potentiometer 38 is provided to enable fine tuning of the power amplifier through a suitable switch 40 located on the front panel of the instrument. The amplified output is applied through an isolator 42 which comprises a ferrite nonreciprocating device to prevent passage of signals back through the amplifying stage. The isolator 42 may comprise for example the Western Microwave W-M2CS-484 isolator.

The amplified voltage is then applied to a bandpass filter 44 which comprises a four cavity bandpass filter with four tunable elements 46 to enable optimum tuning of the device. The bandpass filter 44 selects a 20 MHz bandpass and the remaining unwanted signal is attenuated by approximately 100 dB. The desired bandpass signal is then applied to a power divider circuit including resistors 48–52 interconnected by "microstrip" transmission lines 54. The power divider divides the signal into an exciter output signal applied at terminal 56 and a stable local oscillator (STALO) signal applied at terminal 58. The STALO signal is applied to subsequent circuitry including filters and the like and then to the radar transmitter. The exciter output is applied to the exciter circuitry shown in FIG. 3. A test output may be obtained at terminal 60 for test purposes.

The STALO output is also applied through a resistive pad 62 and through a detector circuit including a diode 64 in order to apply a sensed STALO signal via lead 66 to the rotary switch 22 for display on the meter 24. A switch 68 may be selectively operated from the front panel in order to selectively energize the performance meter 24.

An important aspect of the STALO circuit shown in FIG. 1 is that the crystal in oscillator 14 may be selectively changed, the multiplier 26 may be suitably varied, the power amplifier circuit tuned and the bandpass filter 44 adjusted in order to provide any desired stable frequency between 2670–2930 MHz.

Figure 2:
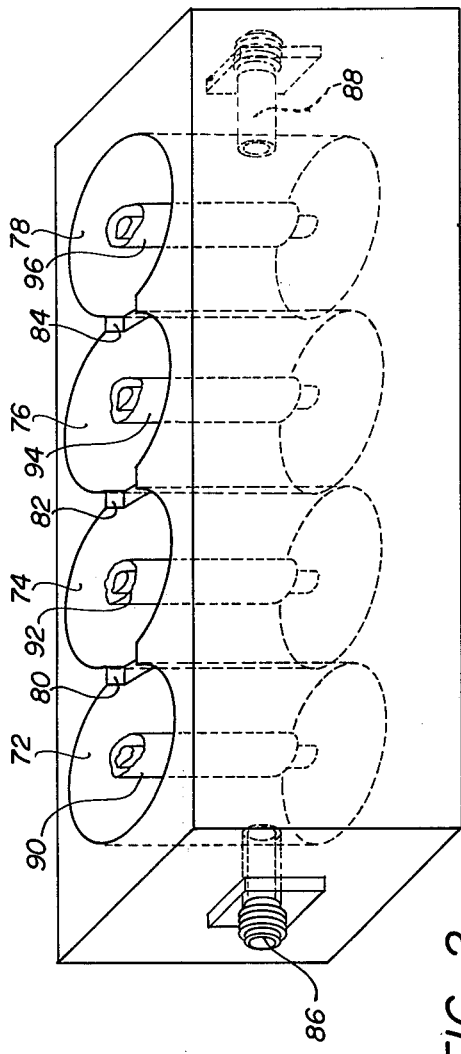
FIG. 2 is a perspective view of the tunable bandpass filter utilized in the system in FIG. 1.

FIG. 2 illustrates the bandpass filter 44 shown in FIG. 1. The filter comprises a metallic block 70 having four cylindrical cavities 72–78 formed therein. The diameters of the cavities 72–78 in the preferred embodiment comprise 0.866 inches and have a depth of 1.4 inches. Apertures 80–84 provide communication between adjacent ones of the cavities. In the preferred embodiment, the depth of the apertures 80–84 are 0.275 inches, the length of the apertures is approximately 0.325 inches, the width of the apertures is 0.02 inches. An inlet aperture 86 provides communication with the cavity 72 and an outlet aperture 88 provides communication with cavity 78.

Four tunable elements 90–96 extend downwardly into the cavity from a top plate, not shown for clarity of illustration. The tunable elements 90–96 comprise an outer cylinder and an inner telescoped cylinder. Rotation of an exterior tuning element causes the inner cylinder to be extended outwardly from the outer cylinder in order that the length of the tunable elements may be varied to adjust the frequency filtered by the bandpass filter 70. The RF signal is thus applied from the inlet aperture 86 through the cavities and outwardly through the output aperture 88. All but a selected bandpass of the signal is substantially attenuated by the filter in dependence upon the length of the tunable elements 90-96.

Figure 3:
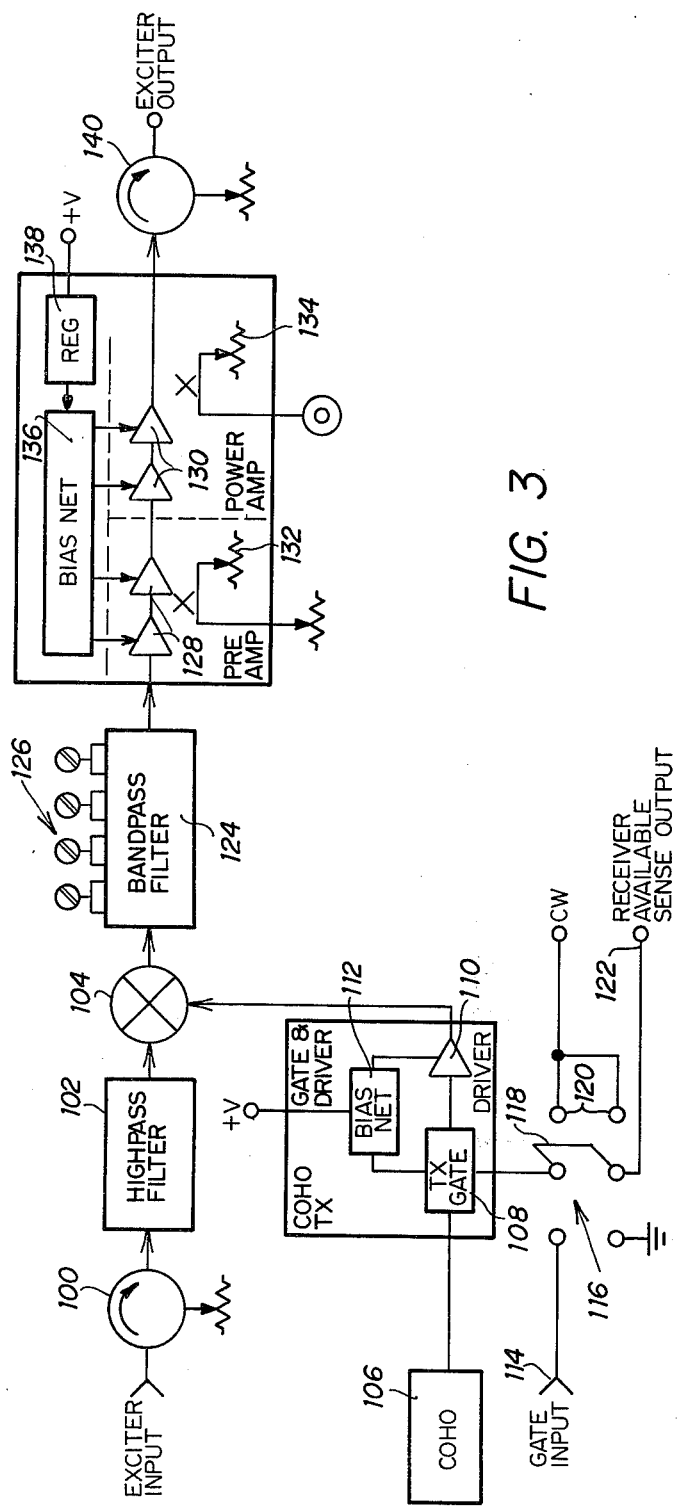
FIG. 3 is a block diagram of the exciter circuitry of the present invention.

FIG. 3 illustrates the exciter circuitry of the invention. The exciter input applied from terminal 56 of the circuit shown in FIG. 1 is applied through an isolator 100 to a high pass filter 102. Filter 102 comprises a L-C filter network made up of capacitors and inductances from specified lengths of transmission lines. The output from the filter 102 is applied to a doubly balanced mixer 104 which may comprise for example the Model No. DB-400 mixer manufactured and sold by Z-Match, a division of Mini L Laboratories.

A coherent oscillator 106 generates a coherent (COHO) signal of 30 MHz which is applied to a transmitter gate 108. The output of gate 108 is applied through a driver 110 to the mixer 104 for mixing withh the exciter input. Bias is applied to the gate 108 and driver 110 from a conventional bias network 112. A gate input, which comprises the main timing signal from the radar receiver, is applied through a terminal 114 and through a double-pole double-throw switch 116 in order to selectively gate the transmitter gate 108.

The double-pole double-throw switch member 118 is normally closed to provide the gate input to the transmitter gate 108. However, the switch member 118 may be closed against terminals 120 such that a continuous wave signal is applied to the transmitter gate 108 for aligning of the exciter circuitry. When the circuitry is being aligned and the continuous wave signal is being applied to the circuit, an output is provided at terminal 122 to indicate to the control circuitry of the radar system that the receiver is being aligned and the radar transmission should be prohibited.

The output of the mixer 104 is applied through a bandpass filter 124 which includes tunable elements 126. Filter 124 may comprise an identical four cavity bandpass filter such as shown in FIG. 2. The tuning elements 126 of the filter are tuned such that only one of the upper or lower sidebands may be passed. The passed sidebands are applied through a four-stage amplification system including preamp 128 and power amplifiers 130 in order to provide a 23 dB gain. The gain provided by the amplification system may be controlled from the front panel by operation of rheostats 132 and 134. A bias network 136 receives the regulated voltage from regulator 138 in order to bias the amplification circuit. The output of the amplification stage is applied through an isolator 140 to provide an exciter output to the radar transmitter chain. The exciter output may comprise any frequency between 2700–2900 MHz.

Figure 4:
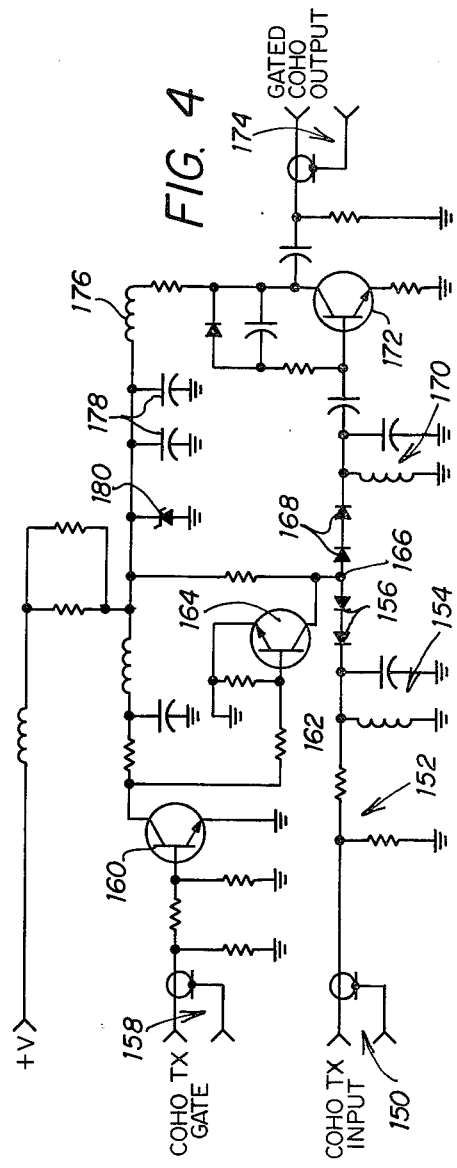
FIG. 4 is a schematic diagram of the transmit gate of the exciter circuitry shown in FIG. 3.

FIG. 4 illustrates in schematic detail the transmitter gate 108 shown in FIG. 3. The coherent oscillator input is applied through terminal 150 and through a matching resistive pad 152 to a LC filter 154. A pair of series connected diodes 156 are connected at their cathodes to the filter circuit 154. The gate signal is applied through terminals 158 to a transistor 160, the collector of which is applied through a resistance 162 to the base of a transistor 164. The collector of transistor 164 is connected to a switching point 166 connected between diodes 156 and a pair of series connected diodes 168. Diode pairs 156 and 168 are connected back-to-back at switching point 166. The cathodes of diodes 168 are connected through an LC filter 170 to the base of a transistor 172 for amplification. The collector of transistor 172 is applied to an output terminal 174. An inductance 176 and capacitors 178 are connected to provide a filter to filter noise from a zener diode 180 which serves as a voltage regulator for the circuit.

In operation, the circuitry thus receives the coherent oscillator signal at terminal 150. Normally, the diodes 156 prevent transmission of the coherent oscillator signal to the output terminal. However, when a gate pulse is received at terminals 158, the transistors 160 and 164 become conductive and allow passage of the coherent oscillator signal through the amplifying transistor 172 to the doubly balanced mixer 104 (FIG. 3).

It may thus be seen that the present system provides a relatively simple and inexpensive RF generator for use with an MTI radar system. The present system is extremely stable and provides stability on the order of $\Delta f/f = 1 \times 10^{-10}$, thereby providing an MTI improvement factor limitation of at least 60 dB to substantially improve the resolution of MTI radar systems. The noise power of the stable local oscillator output is less than $-114$ dBM measured in a one MHz bandwidth $\pm 30$ MHz from the stable local oscillator output frequency. The limit of thermal noise (kTB) in a one MHz bandwidth $\pm 30$ MHz from the carrier is $-114$ dBM. Similarly, the exciter circuitry provides extremely low noise operation while providing a stable output exciter signal. Both the stable local oscillator and exciter circuitry may be conveniently and easily tuned to various desired frequencies without substantial modification of the circuitry. The present exciter circuit enables calibration of the radar exciter by use of a simple switch and the application of continuous wave signals, while preventing transmission of radar signals during the alignment procedures.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:
1. A RF generator for a radar system comprising:
   an oscillator including a crystal for generating a predetermined VHF signal,
   a multiplier for multiplying said VHF signal to a desired RF signal,
   amplifying circuitry for amplifying said RF signal,
   a first isolator for preventing passage of signals to the output of said amplifying circuitry while allowing passage of said RF signal,
   a filter connected to the output of said first isolator including plural cavities for filtering all but a selected narrow bandwidth signal from said RF signal,
   a power divider for dividing said narrow bandwidth signal to provide a stable local oscillator signal and an exciter signal,
   a second isolator connected to pass said exciter signal,
   a high pass filter for filtering said exciter signal,
   a coherent oscillator for generating a stable coherent oscillator signal,
   a transmit switch for gating said coherent oscillator signal in response to a radar timing signal,
   a mixer for mixing the gated coherent oscillator signal with the filtered exciter signal,
   a bandpass filter for passing a selected one of the upper and lower side bands of the output from said mixer,
   an exciter amplifier for amplifying the output of said bandpass filter, and
   a third isolator connected to pass the output of said exciter amplifier.

2. The RF generator of claim 1 and further comprising:
   means for sensing operation of said multiplier, and
   meter means for displaying the operation of said multiplier.

3. The RF generator of claim 1 and further comprising means for tuning said multiplier to multiply said VHF signal to any one of a plurality of RF signals.

4. The RF generator of claim 1 wherein said filter includes means for adjusting the selected narrow bandwidth.

5. The RF generator of claim 1 wherein said power divider comprises a resistive network having a pair of outputs.

6. The RF generator of claim 1 and further comprising:
   means for detecting said stable local oscillator signal, and
   meter means for displaying an indication of said oscillator signal.

7. The RF generator of claim 1 wherein said transmit switch includes back-to-back diodes for gating said coherent oscillator signal.

8. The RF generator of claim 1 and further comprising:
   a sourse of a continuous wave signal,
   a switch connected to the source of the radar timing signal and said transmit switch and operable to disconnect the radar timing signal and to connect said source of the continuous wave signal to said transmit switch, wherein the continuous wave signal enables alignment of the radar exciter, and
   means for sensing the application of the continuous wave signal to said transmit switch.

9. An RF generator for generating a predetermined RF signal comprising:
   an oscillator including a removable crystal for generating a preselected VHF signal,
   a multiplier coupled to the oscillator output for multiplying said VHF signal to a desired RF signal,
   a power amplifier coupled to the multiplier for enhancing the strength of the desired RF signal, said power amplifier including a tuning means for fine tuning the desired RF signal,
   a tunable bandpass filter for selecting a desired bandpass signal from said RF signal and attenuating the nonselected signal,
   a power divider coupled to the tunable bandpass filter for dividing the selected bandpass signal into a plurality of selected signals including a signal for an exciter, and
   an exciter coupled to the power divider for producing exciter signals, said exciter including a coherent oscillator for generating a coherent signal, means coupled to the coherent oscillator and power divider for selectively mixing the coherent oscillator signal with the signal of the power divider for the exciter, and means for passing a selected side band of the mixed RF signals as an exciter signal.

10. An RF generator according to claim 9 wherein the means coupled to the coherent oscillator and power divider for selectively mixing the coherent oscillator signal with the signal of the power divider for the exciter includes a gating switch coupled to the coherent oscillator for gating said coherent oscillator signal in response to a timing signal, and a doubly balanced mixer for mixing the gated coherent oscillator signal with the filtered RF signal.

11. An RF generator according to claim 9 wherein the means for passing a selected side band of the mixed RF signals as an exciter signal includes a tunable bandpass filter for passing a selected one of the upper or lower side bands of the output from said mixer.

* * * * *